United States Patent
Valencia Cruz et al.

(10) Patent No.: US 9,238,438 B1
(45) Date of Patent: Jan. 19, 2016

(54) LATERALLY MOVING CARGO SHADE AND NET

(71) Applicant: GM GLOBAL TECHNOLOGY OPERATIONS LLC, Detroit, MI (US)

(72) Inventors: Gustavo E. Valencia Cruz, Coyoacan (MX); Carl W. Wellborn, Detroit, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/340,652

(22) Filed: Jul. 25, 2014

(51) Int. Cl.
*B60N 3/12* (2006.01)
*B60R 5/04* (2006.01)

(52) U.S. Cl.
CPC ...................................... *B60R 5/045* (2013.01)

(58) Field of Classification Search
CPC ...... A45C 13/262; A45C 5/14; Y10T 16/451; A47F 7/30; B60R 21/00; B60R 5/047; B60R 7/02; B60R 7/005; B60R 2021/065
USPC ............. 296/37.16, 24.43, 37.1; 160/238, 24, 160/25; 224/539; 280/749; 410/97
See application file for complete search history.

(56) References Cited

U.S. PATENT DOCUMENTS

| 906,848 A | * | 12/1908 | Atwell ........................... 473/493 |
| 1,300,972 A | * | 4/1919 | Janssen ......................... 473/493 |
| 4,993,719 A | * | 2/1991 | Hernandez .................... 473/492 |
| 5,213,387 A | * | 5/1993 | Decker et al. ............... 296/37.16 |
| 5,224,748 A | * | 7/1993 | Decker et al. ............... 296/37.16 |
| 5,538,306 A | * | 7/1996 | Ament .......................... 296/37.1 |
| 5,632,520 A | * | 5/1997 | Butz .......................... 296/24.43 |
| 5,711,568 A | * | 1/1998 | Diem et al. ................. 296/37.16 |
| 5,893,597 A | * | 4/1999 | Rider ........................... 296/37.6 |
| 6,056,038 A | * | 5/2000 | Foster et al. .................. 160/351 |
| 6,183,177 B1 | * | 2/2001 | Dahlgren ....................... 410/100 |
| 6,334,562 B1 | * | 1/2002 | Ament et al. .................. 224/563 |
| 6,616,389 B1 | * | 9/2003 | Ament et al. ................. 410/118 |
| 6,739,812 B1 | * | 5/2004 | Pfeifer et al. ................. 410/118 |
| 6,749,241 B1 | * | 6/2004 | Erlandsson et al. ......... 296/24.4 |
| 6,793,449 B1 | * | 9/2004 | Simpson et al. .............. 410/100 |
| 6,942,269 B2 | * | 9/2005 | Mains ......................... 296/37.16 |
| 6,948,760 B2 | * | 9/2005 | Marx et al. ............... 296/100.12 |
| 7,604,272 B2 | * | 10/2009 | Day ............................ 296/37.16 |
| 7,857,372 B2 | * | 12/2010 | Fukushima et al. ....... 296/37.16 |
| 2013/0193708 A1 | * | 8/2013 | Lucas ........................ 296/37.16 |

* cited by examiner

*Primary Examiner* — Kiran B Patel
(74) *Attorney, Agent, or Firm* — Quinn Law Group, PLLC

(57) ABSTRACT

A vehicle includes a body that extends lengthwise along a longitudinal axis, and defines an cargo area laterally bounded by a first lateral side wall and a second lateral side wall. A shade assembly includes a housing that is removably attached to the first lateral side wall. A retractable cover is retractably supported by the housing, and is extendable across the cargo area to cover the cargo area. A retractable net is retractably supported by the housing, and is extendable away from the housing to secure cargo relative to the body. The housing extends in a lengthwise direction along a central axis that is disposed substantially parallel with the longitudinal axis of the body, when attached to the first lateral side wall. The retractable cover and the retractable net each extend and retract independently of each other in a direction transverse to the longitudinal axis.

10 Claims, 8 Drawing Sheets

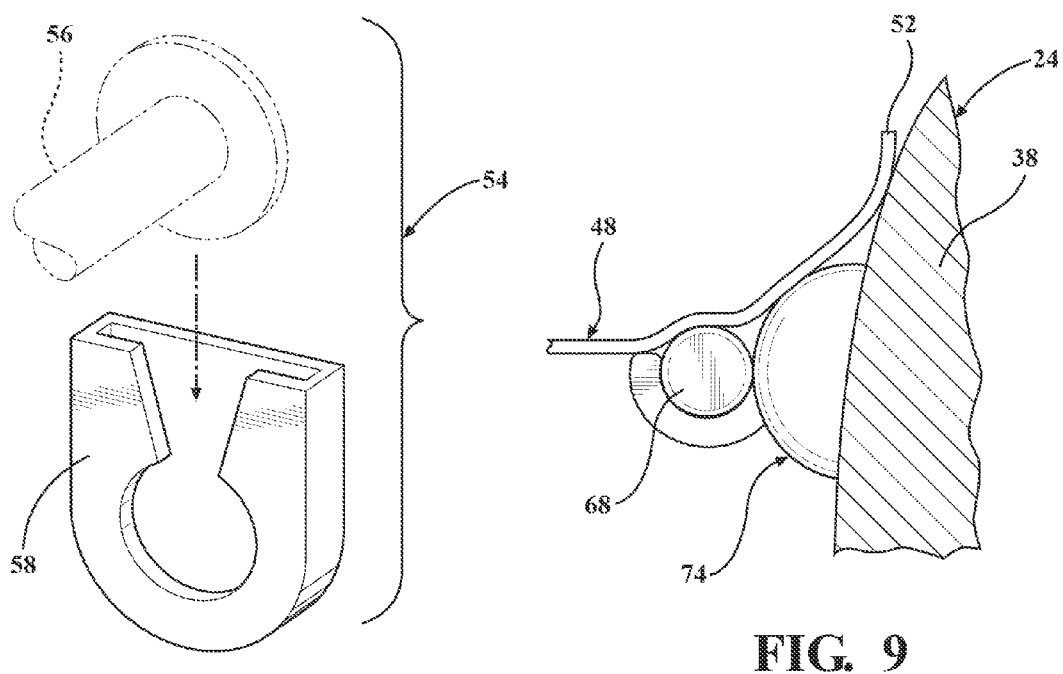
FIG. 8
FIG. 9
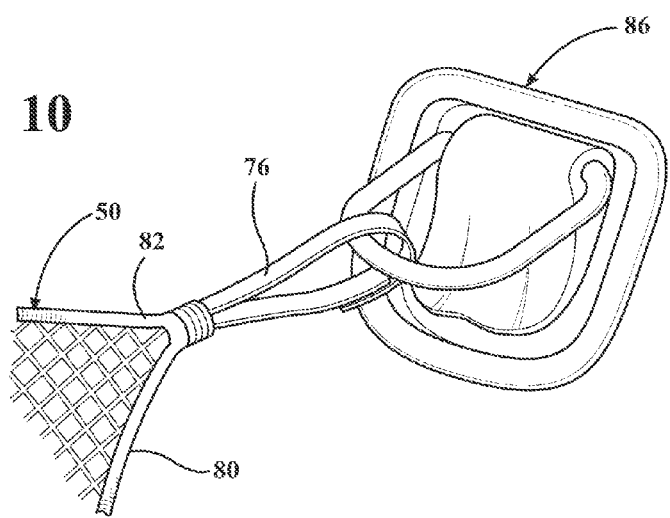
FIG. 10

LATERALLY MOVING CARGO SHADE AND NET

TECHNICAL FIELD

The invention generally relates to a vehicle having an cargo area, and more specifically to a cargo shade and net assembly for the cargo area of the vehicle.

BACKGROUND

Vehicles, such as a Sport Utility Vehicle (SUV), a station wagon, or a van, may include an cargo area that is generally defined by a roof of the vehicle above, a floor of the vehicle below, lateral opposing sidewalls of the vehicle, a liftgate at the rear of the vehicle, and a backrest of a passenger seat. Some vehicles may include a cargo shade that covers the cargo area. Typically, the cargo shade is attached to the backrest of the passenger seat, and is used in a fore/aft direction of the vehicle.

SUMMARY

A vehicle is provided. The vehicle includes a body extending along a longitudinal axis between a forward end and a rearward end. The body includes a first lateral side wall and a second lateral side wall. The first lateral side wall and the second lateral side wall cooperate to define a cargo area therebetween. A shade assembly is coupled to the first lateral side wall. The shade assembly includes a retractable cover that is extendable across the cargo area, and is configured for attachment to the second lateral side wall. The retractable cover extends and retracts laterally across the cargo area, in a direction transverse to the longitudinal axis of the body.

A vehicle is also provided, which includes a body that extends lengthwise along a longitudinal axis, and defines an cargo area laterally bounded by a first lateral side wall and a second lateral side wall on opposing lateral sides of the longitudinal axis. A shade assembly includes a housing that is removably attached to the first lateral side wall. A retractable cover is retractably supported by the housing. The retractable cover is extendable across the cargo area for attachment to the second lateral side wall to cover the cargo area. A retractable net is retractably supported by the housing. The retractable net is extendable away from the housing for attachment to the first lateral sidewall or the second lateral sidewall to secure cargo relative to the body. The housing extends in a lengthwise direction along a central axis that is disposed substantially parallel with the longitudinal axis of the body, when attached to the first lateral side wall. The retractable cover and the retractable net each extend and retract independently of each other, from the housing, in a direction transverse to the longitudinal axis of the body.

Accordingly, both the retractable cover and the retractable net extend and retract laterally across the cargo area, in a direction transverse to the longitudinal axis of the body. A length of the housing that supports the retractable cover and the retractable net may be minimized because the housing extends generally parallel with the longitudinal axis of the body. The length of the housing is minimized because the cargo area includes a length, which is measured parallel with the longitudinal axis of the body, which is shorter than a width of the cargo area, which is measured transverse to the longitudinal axis of the body. Additionally, a user only needs to reach a little way into the cargo area to grasp the retractable cover and/or the retractable net, thereby improving the ease of operation of the retractable cover and/or the retractable net.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 8 is a schematic fragmentary perspective view of an attachment mechanism for attaching the shade assembly to a first lateral side wall of the vehicle.

FIG. 9 is a schematic fragmentary cross sectional view of the vehicle showing a catch engaging a rod of the retractable cover.

FIG. 10 is a schematic perspective view of a clip of the retractable net attached to a tie-down of the body to secure a distal edge of the retractable net relative to the body.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims. Furthermore, the invention may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a vehicle is generally shown at 20. The vehicle 20 may include any vehicle that defines a cargo area 22, such as but not limited to a Sport Utility Vehicle (SUV), cargo van, or some other similarly configured vehicle.

Figure 1:
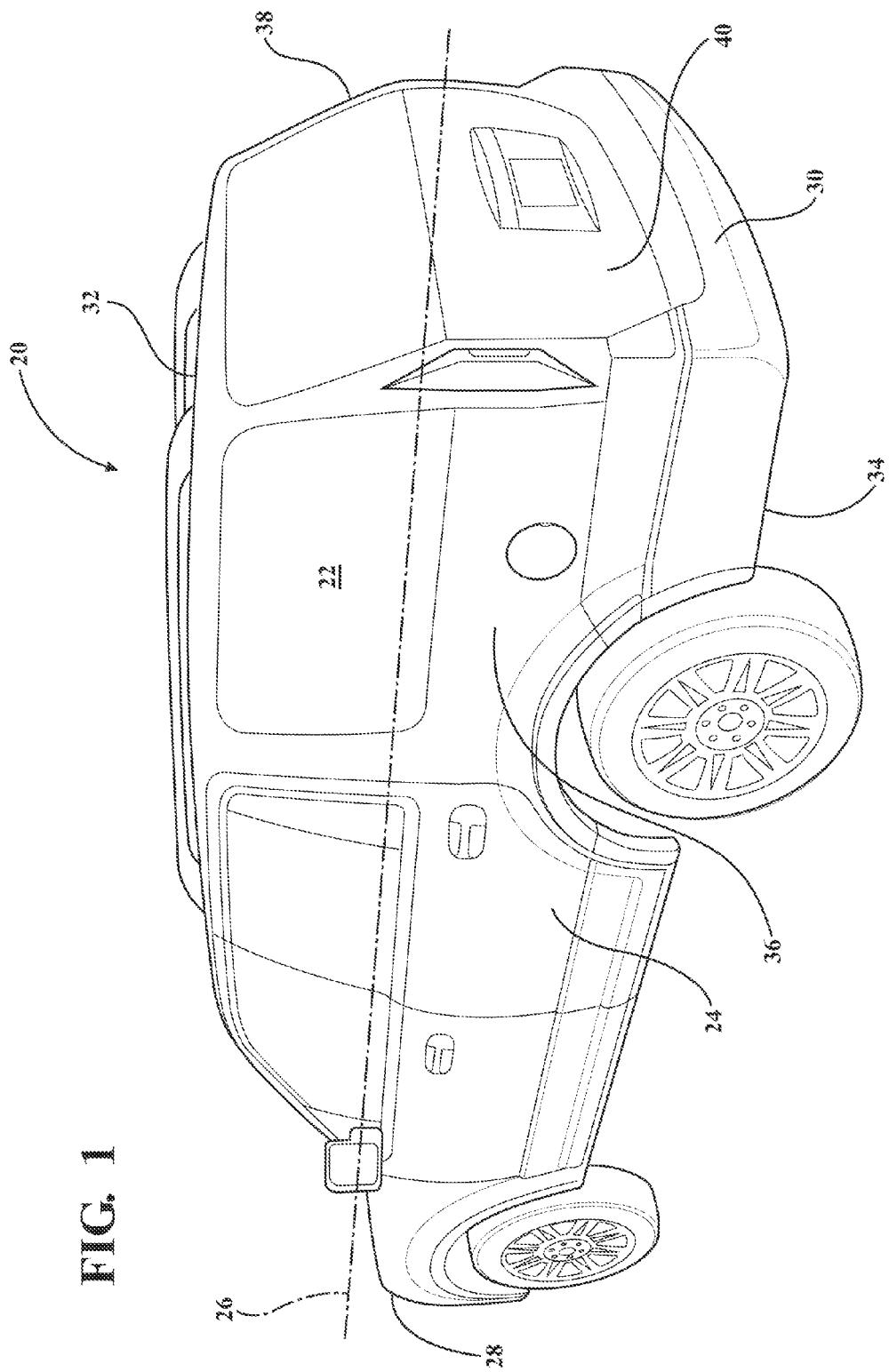
FIG. 1 is a schematic perspective view of a vehicle.
Figure 2:
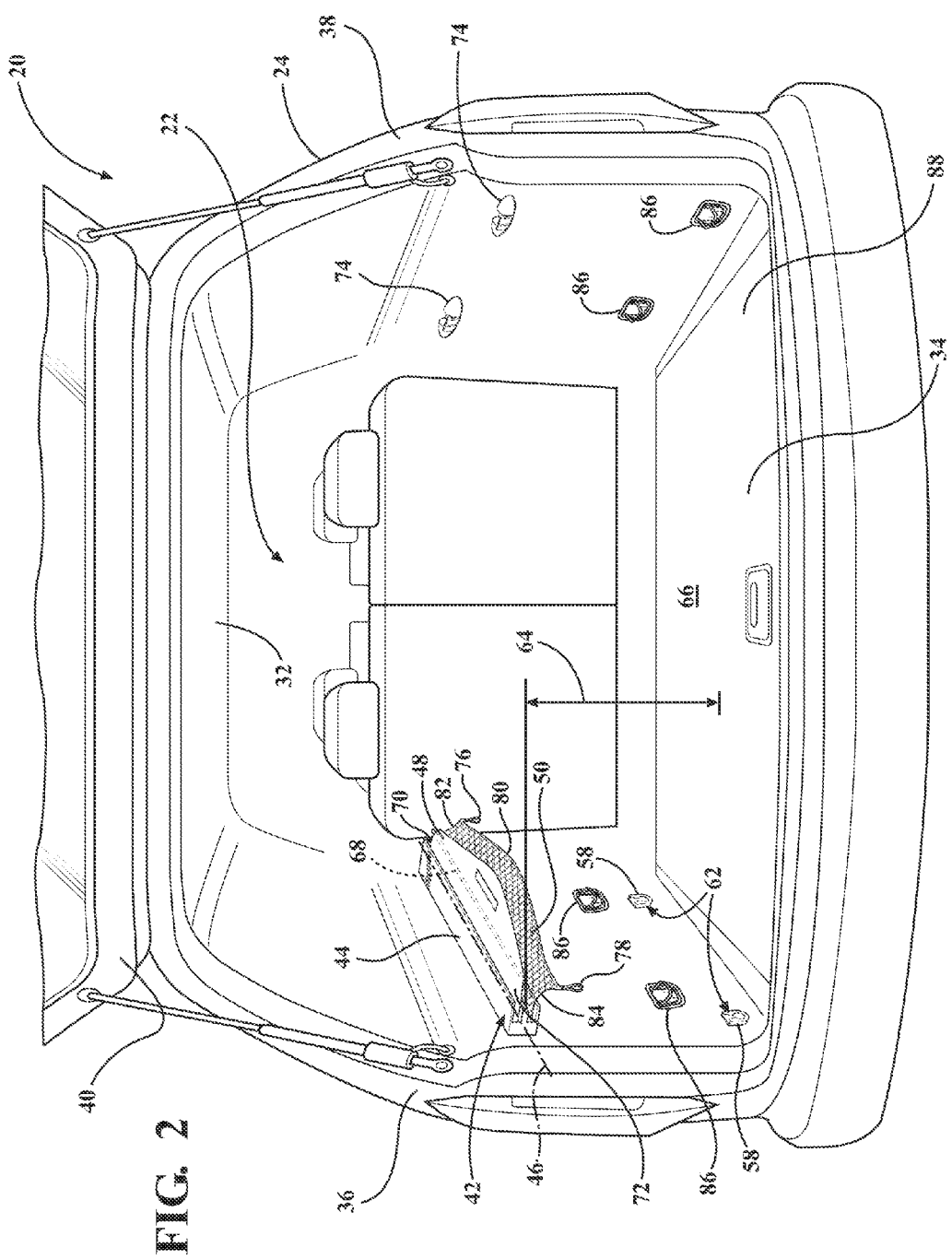
FIG. 2 is a schematic perspective view of the vehicle showing an cargo area and shade assembly having a retractable cover and a retractable net in a retracted position.

Referring to FIG. 1, the vehicle 20 includes a body 24. The body 24 extends lengthwise along a longitudinal axis 26, between a forward end 28 and a rearward end 30. Referring also to FIG. 2, the body 24 includes a roof 32, a floor 34 vertically spaced from the roof 32, a first lateral side wall 36, and a second lateral side wall 38 opposing the first lateral side wall 36. Both of the first lateral side wall 36 and the second lateral side wall 38 extend between the roof 32 and the floor 34, with the roof 32, the floor 34, the first lateral side wall 36, and the second lateral side wall 38 cooperating to define the cargo area 22 therebetween. The cargo area 22 is laterally bounded by the first lateral side wall 36 and the second lateral side wall 38, is vertically bounded above by the roof 32, and is vertically bounded below by the floor 34. A rear door 40 may bound a rearward end of the cargo area 22, adjacent the rearward end 30 of the body 24.

Referring to FIG. 2, a shade assembly 42 is coupled to one of the first lateral side wall 36 or the second lateral side wall 38. In the exemplary embodiment shown in the Figures, the shade assembly 42 is shown disposed on the first lateral side wall 36 of the body 24. However, it should be appreciated that the shade assembly 42 may alternatively be configured for attachment to the second lateral side wall 38 of the body 24. Furthermore, the first lateral side wall 36 is shown in the Figures disposed on a left or drivers side of the vehicle 20, and the second lateral side wall 38 is disposed on a right or passenger side of the vehicle 20. However, it should be appreciated that the relative positions of the first lateral side wall 36 and the second lateral side wall 38 may be reversed, with the first lateral side wall 36 defined as being on the right or passenger side of the body 24, and the second lateral side wall 38 defined as being on the left or drivers side of the body 24.

Figure 6:
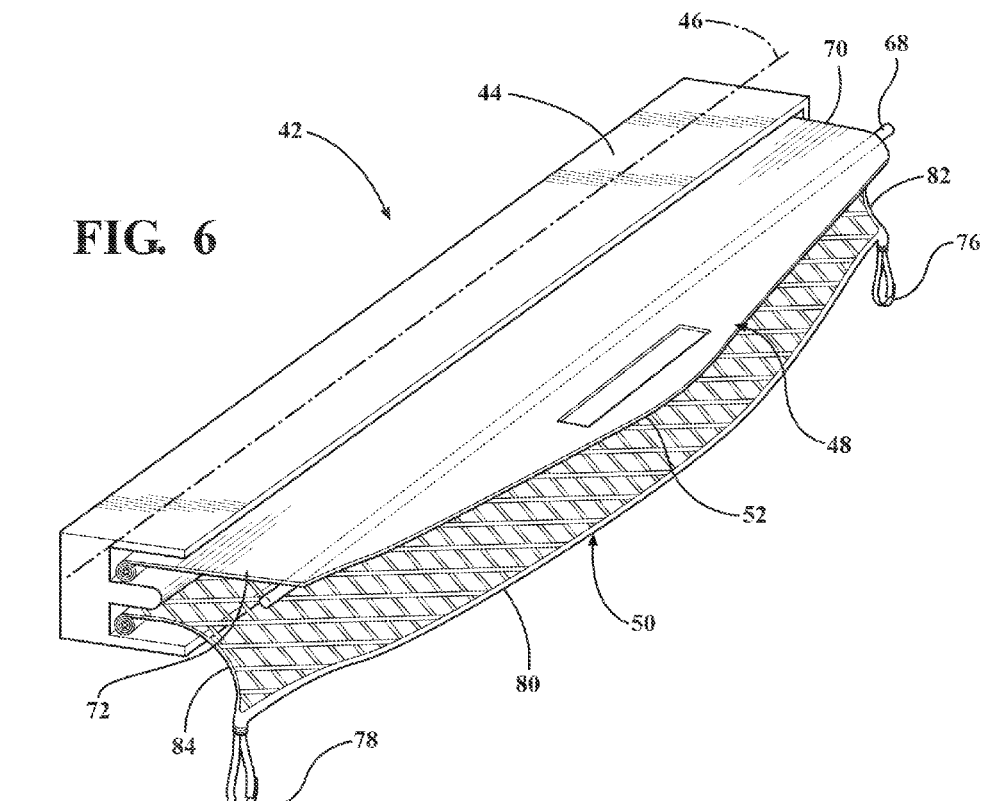
FIG. 6 is a schematic perspective view of the shade assembly from a first perspective.
Figure 7:
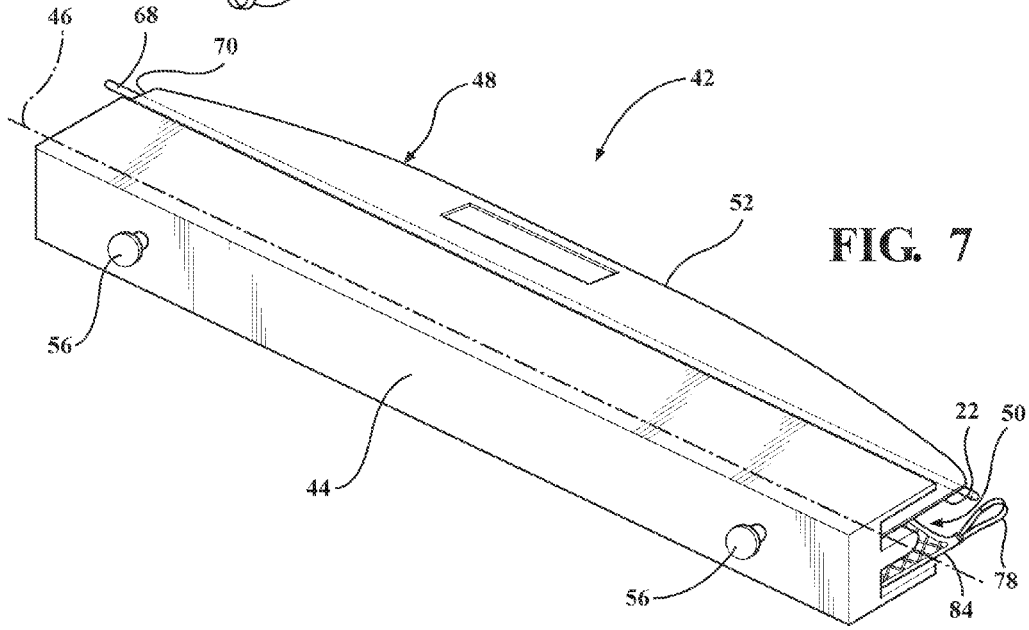
FIG. 7 is a schematic perspective view of the shade assembly from a second perspective.

As shown in FIG. 2, the shade assembly 42 may include a housing 44 that is removably attached to either the first lateral side wall 36 or the second lateral side wall 38. Alternatively, the shade assembly 42 may be integrated into an interior trim piece, adjacent the first lateral side wall 36. Referring also to FIGS. 6 and 7, the housing 44 extends in a long or lengthwise direction, along a central axis 46. When the shade assembly 42 is attached to the first lateral side wall 36, the central axis 46 of the housing 44 extends and is disposed substantially parallel with the longitudinal axis 26 of the body 24.

The housing 44 retractably supports a retractable cover 48 and a retractable net 50. FIG. 2 shows both the retractable cover 48 and the retractable net 50 in respective retracted positions. The housing 44 includes a retraction mechanism (not shown), which may include all gears, springs, rollers, etc., capable of allowing the retractable cover 48 and the retractable net 50 to extend outward from the housing 44 for use, and retract back into the housing 44 for storage. The retraction mechanism may be configured in any suitable manner. As such, the specific design and configuration of the retraction mechanism is not shown nor described in detail herein. Furthermore, the shade assembly 42 may include a first retraction mechanism for the retractable cover 48, and a second, separate retraction mechanism for the retractable net 50. The retractable cover 48 and the retractable net 50 each extend and retract independently of each other. When the housing 44 is attached to the first lateral side wall 36, the retractable cover 48 and the retractable net 50 each extend from the housing 44 in a direction transverse to the longitudinal axis 26 of the body 24.

Figure 3:
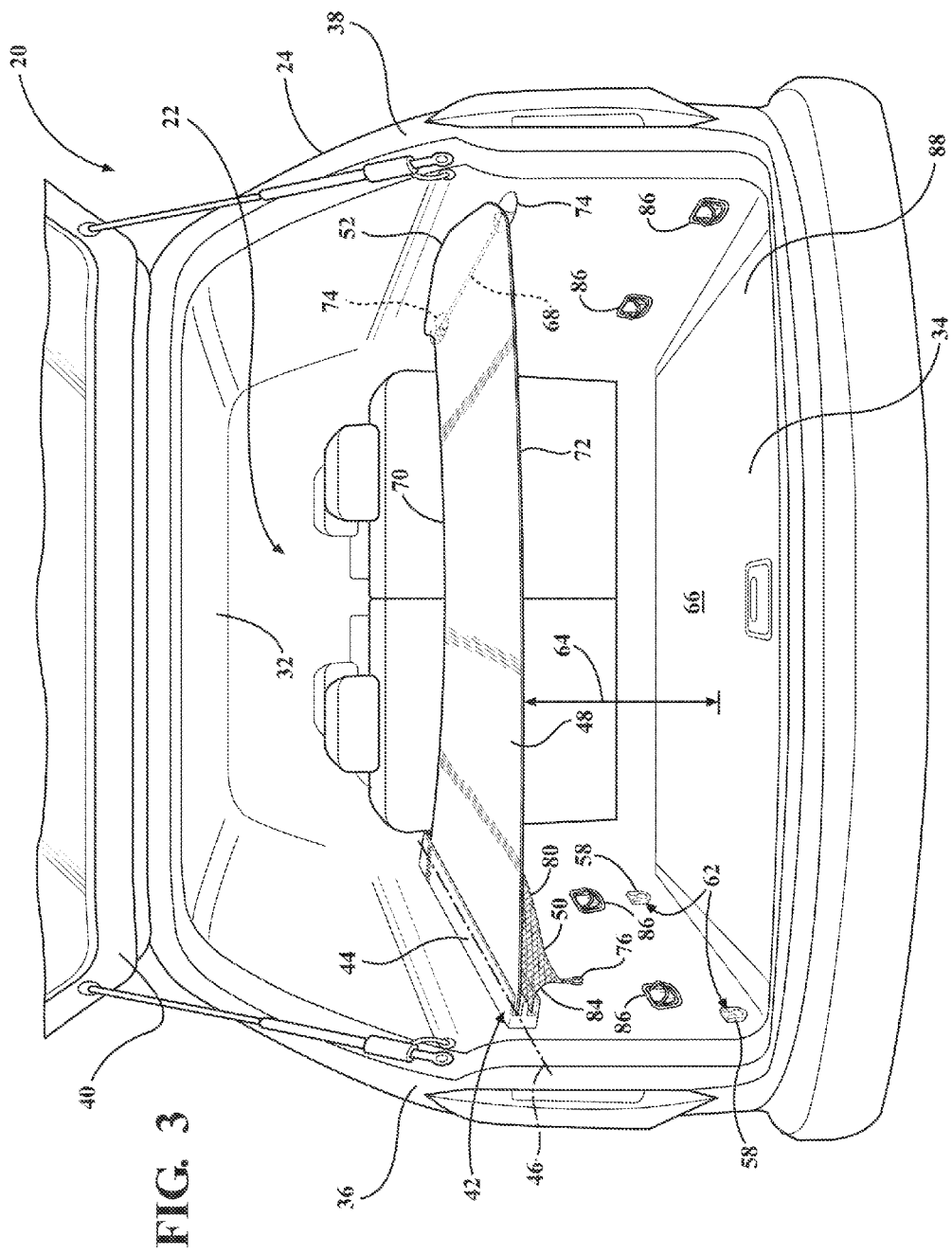
FIG. 3 is a schematic perspective view of the vehicle showing the shade assembly in a high mount position, with the retractable cover extended across the cargo area.

Referring to FIG. 3, the retractable cover 48 may be extended outward from the housing 44, to span across the cargo area 22. A distal edge 52 of the retractable cover 48 is configured for attachment to the second lateral side wall 38 to cover the cargo area 22. As such, when the housing 44 is attached to the first lateral side wall 36, the housing 44 supports one edge of the retractable cover 48, and the distal edge 52 of the retractable cover 48 is attached to the second lateral side wall 38 for support thereof. The retractable net 50 is extendable away from the housing 44, for attachment to either the first lateral sidewall or the second lateral sidewall, to secure cargo relative to the body 24 of the vehicle 20. For example, referring to FIG. 4, if the retractable net 50 is secured to the first lateral side wall 36, then the retractable net 50 may be extended outward from the housing 44, and secured to the first lateral side wall 36 to form a side pocket disposed adjacent the first lateral side wall 36. Alternatively, referring to FIG. 5, the retractable net 50 may be extended outward away from the housing 44, and secured to the second lateral side wall 38 to form a pocket disposed adjacent to a primary load bearing surface 66 of the floor 34.

Referring to FIGS. 7 and 8, the vehicle 20 includes an attachment mechanism 54, which is operable to attach the housing 44 to the first lateral side wall 36. The attachment mechanism 54 may include any mechanism that is capable of removably attaching the housing 44 to the first lateral side wall 36. For example, referring to FIG. 7, the attachment mechanism 54 may include a plurality of pins 56 attached to the housing 44 at opposing ends of the housing 44 along the central axis 46. Referring to FIG. 8, the attachment mechanism 54 includes a plurality of receiving notches 58 formed into the first lateral side wall 36. Each of the pins 56 is operably received within one of the receiving notches 58, in a tight, snap fit connection, to secure the housing 44 to the first lateral side wall 36. The shape, size, and configuration of the pins 56, and the corresponding shape, size, and configuration of the receiving notches 58 may vary from the exemplary embodiment shown in the Figures.

Figure 4:
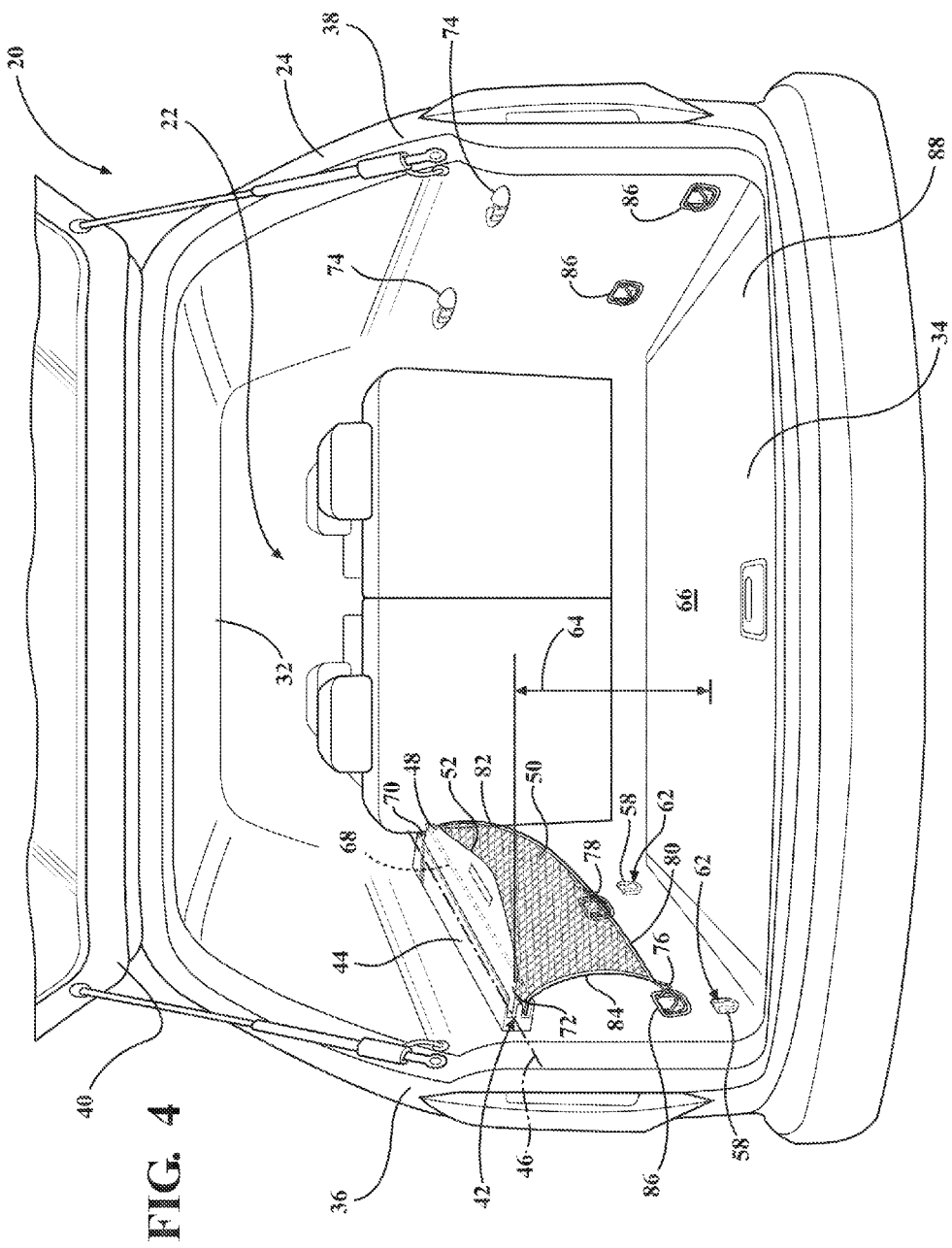
FIG. 4 is a schematic perspective view of the vehicle showing the shade assembly in the high mount position, with the retractable net extended downward to form a side restraining pocket.
Figure 5:
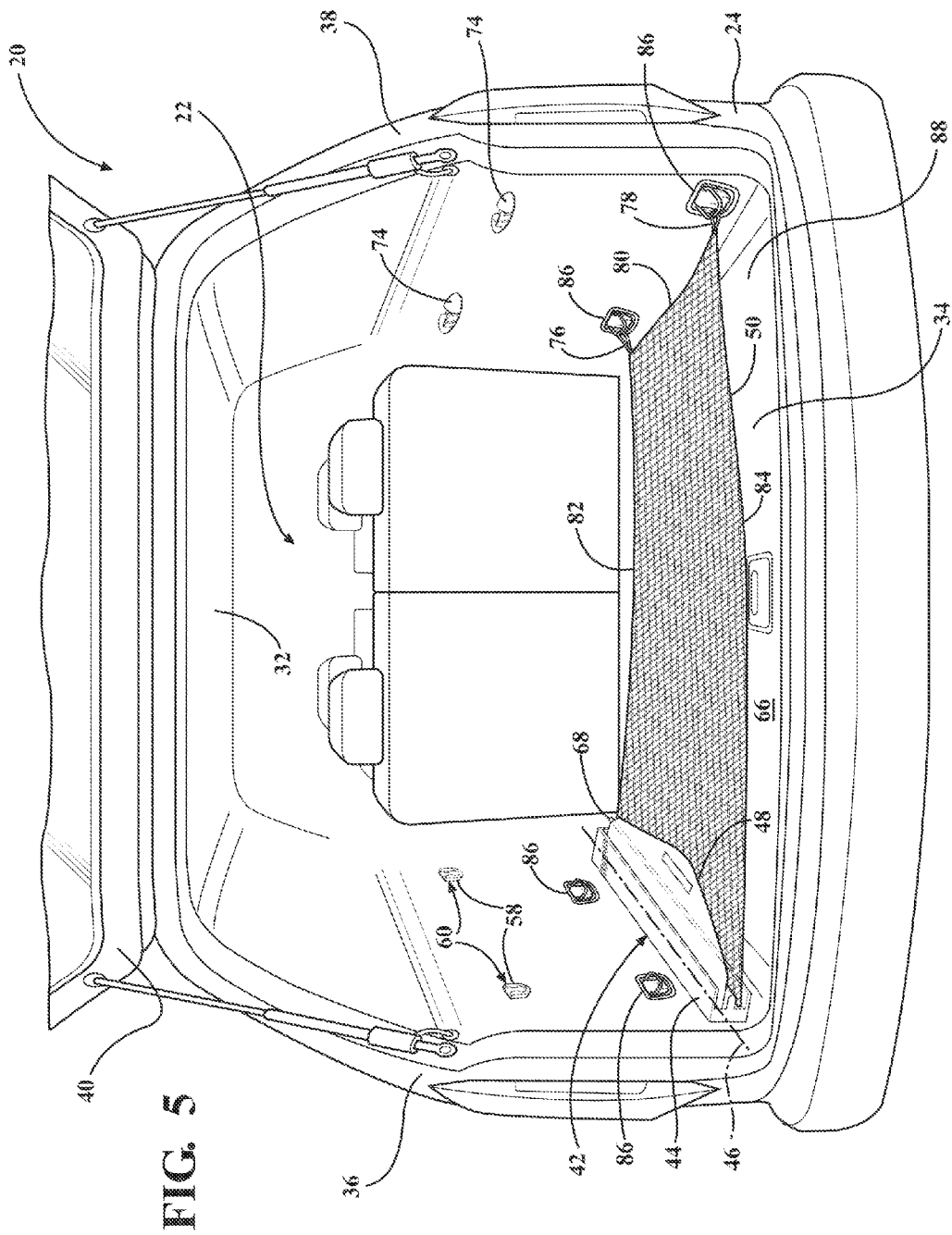
FIG. 5 is a schematic perspective view of the vehicle showing the shade assembly in a low mount position, with the retractable net extended across the cargo area to form a bottom restraining pocket.

Referring to FIGS. 3 through 5, the plurality of receiving notches 58 may include an upper set 60 (shown in FIG. 5) of receiving notches 58 and a lower set 62 (shown in FIGS. 3 and 4) of receiving notches 58. The upper set 60 of receiving notches 58 is configured to attach the housing 44 to the first lateral side wall 36 at a pre-defined distance 64 vertically above the primary load bearing surface 66 of the floor 34, such as shown in FIGS. 3 and 4. The lower set 62 of receiving notches 58 is configured to attach the housing 44 to the first lateral side wall 36 adjacent to the primary load bearing surface 66 of the floor 34, such as shown in FIG. 5. Accordingly, the housing 44 may be attached to the first lateral side wall 36 at two different vertical locations relative to the floor 34, for using either the retractable cover 48 or the retractable net 50.

Referring to FIG. 9, the retractable cover 48 includes a support rod 68 that is attached to the distal edge 52 of the retractable cover 48. Referring also to FIG. 3, the support rod 68 extends along the central axis 46, between a forward edge 70 and a rearward edge 72 of the retractable cover 48. The forward edge 70 of the retractable cover 48 is disposed nearer the forward end 28 of the body 24 when the shade assembly 42 is attached to the first lateral side wall 36, and the rearward edge 72 of the retractable cover 48 is disposed nearer the rearward end 30 of the body 24 when the shade assembly 42 is attached to the first lateral side wall 36.

Referring to FIG. 9, the second lateral side wall 38 includes at least one catch 74. The catch 74 is operable to engage and support the rod, and secure the distal edge 52 of the retractable cover 48 adjacent the second lateral side wall 38. The catch 74 may be configured and/or shaped in any suitable manner capable of grasping and engaging the support rod 68, and securing the support rod 68 relative to the second lateral side wall 38. Preferably, the vehicle 20 includes a plurality of catches 74, longitudinally spaced along the longitudinal axis 26 of the vehicle 20 on the second lateral side wall 38, to engage and grasp the support rod 68 at multiple locations. Furthermore, the second lateral side wall 38 may include a first set of catches 74 disposed at the pre-defined distance 64 above the floor 34, and a second set of catches 74 disposed adjacent the floor 34.

Referring to FIGS. 4, 5 and 10, the retractable net 50 may include a first clip 76 disposed at a first distal corner of the retractable net 50, and a second clip 78 disposed at a second distal corner of the retractable net 50. The first distal corner of the retractable net 50 is disposed at an intersection of a distal edge 80 of the retractable net 50 and a forward edge 82 of the retractable net 50. The second distal corner of the retractable net 50 is disposed at an intersection of the distal edge 80 of the retractable net 50 and a rearward edge 84 of the retractable net 50.

Referring to FIG. 10, each of the first lateral side wall 36 and the second lateral side wall 38 include a plurality of tie-downs 86. The tie-downs 86 are operable to engage the first clip 76 and/or the second clip 78 to secure the retractable net 50 relative to the first lateral side wall 36 or the second lateral side wall 38 respectively. The tie-downs 86 may be independent of, or integrated with the catches 74 used to secure the support rod 68 of the retractable cover 48. The tie-downs 86 may be spaced on the first lateral side wall 36 and the second lateral side wall 38 to provide a variety of different securement configurations for the retractable net 50.

Figure 11:
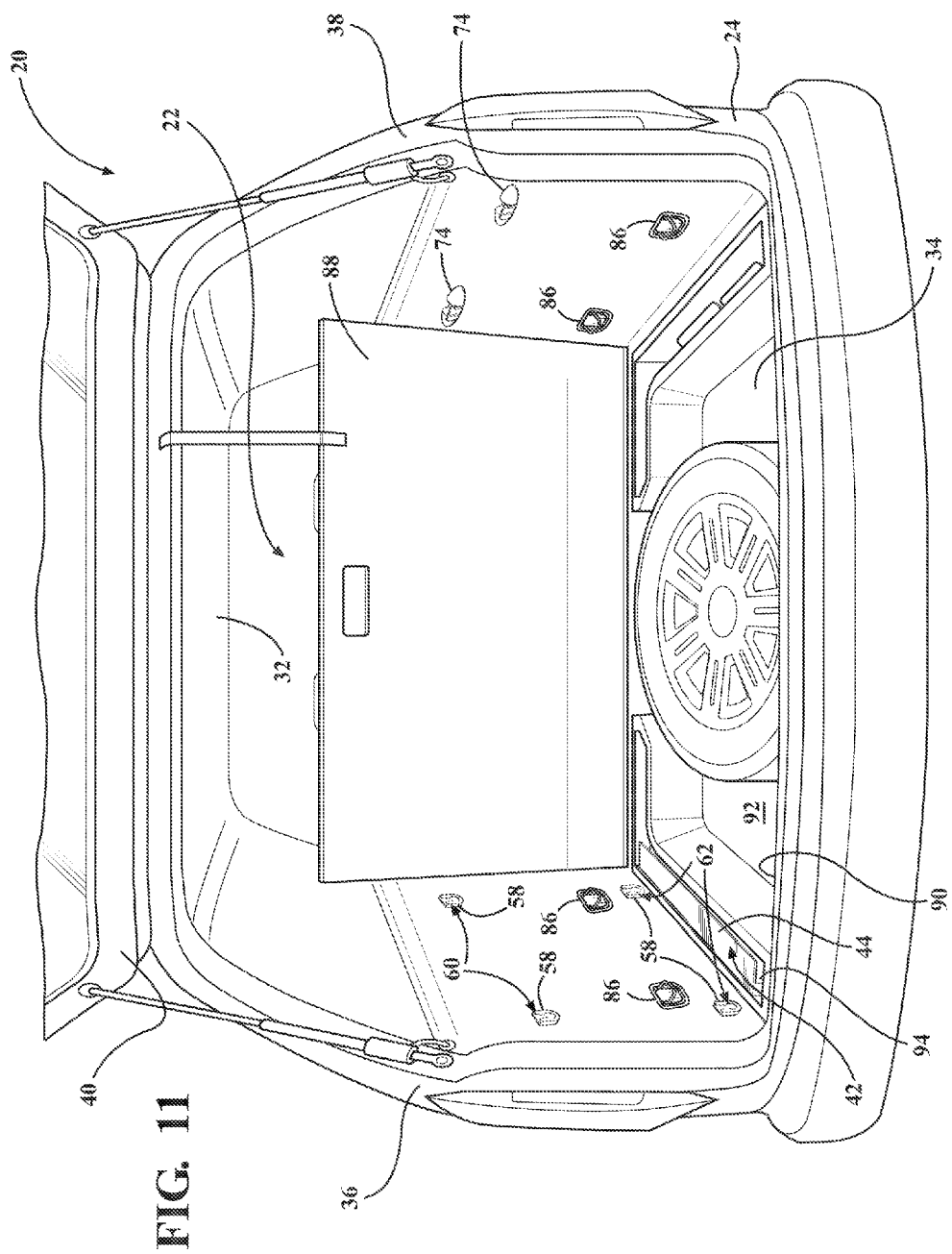
FIG. 11 is a schematic perspective view of the vehicle showing the shade assembly stowed in a storage space below the cargo area of the vehicle.

Referring to FIG. 11, the body 24 may include a panel 88 that defines the primary load bearing surface 66 of the cargo area 22, with the floor 34 defining a pocket 90 having a lower surface 92 disposed vertically below the panel 88 to define a storage space 94 between the panel 88 and the lower surface 92 of the pocket 90. When not in use, the shade assembly 42 may be removed or detached from the first lateral side wall 36, and stored in the storage space 94. The shade assembly 42 and the storage space 94 are sized and/or shaped such that the shade assembly 42 may be stowed in the storage space 94 and covered by the panel 88 when not attached to the first lateral side wall 36.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A vehicle comprising:
   a body extending along a longitudinal axis and having a first lateral side wall and a second lateral side wall cooperating to define a cargo area therebetween; and
   a shade assembly coupled to the first lateral side wall, and including a retractable cover extendable across the cargo area and configured for attachment to the second lateral side wall;
   wherein the retractable cover extends and retracts laterally across the cargo area, in a direction transverse to the longitudinal axis of the body;
   wherein the shade assembly includes a housing removably attached to the first lateral side wall, and retractably supporting the retractable cover, wherein the housing extends in a lengthwise direction along a central axis that is disposed substantially parallel with the longitudinal axis of the body when attached to the first lateral side wall; and
   wherein the body includes a panel defining a primary load bearing surface of the cargo area, with the floor defining a pocket having a lower surface disposed vertically below the panel to define a storage space between the panel and the lower surface of the pocket, wherein the shade assembly and the storage space are sized such that the shade assembly may be stowed in the storage space when not attached to the first lateral side wall.

2. A vehicle as set forth in claim 1 further comprising an attachment mechanism operable to attach the housing to the first lateral side wall.

3. A vehicle as set forth in claim 2 wherein the attachment mechanism includes a plurality of pins attached to the housing at opposing ends of the housing along the central axis, and a plurality of receiving notches formed into the first lateral side wall, wherein each of the pins is operably received within one of the receiving notches to secure the housing to the first lateral side wall.

4. A vehicle as set forth in claim 3 wherein the plurality of receiving notches includes an upper set of receiving notches operable to attach the housing to the first lateral side wall at a pre-defined distance vertically above the floor.

5. A vehicle as set forth in claim 4 wherein the plurality of receiving notches includes a lower set of receiving notches operable to attach the housing to the first lateral side wall adjacent to the floor.

6. A vehicle as set forth in claim 1 wherein the retractable cover includes a support rod attached to a distal edge of the retractable cover, and extending along the central axis, between a forward edge and a rearward edge of the retractable cover.

7. A vehicle as set forth in claim 6 wherein the second lateral side wall includes at least one catch operable to engage and support the rod, and secure the distal edge of the retractable cover adjacent the second lateral side wall.

8. A vehicle as set forth in claim 1, wherein the shade assembly includes a retractable net retractably supported by the housing, and extendable across the cargo area.

9. A vehicle as set forth in claim 8 wherein the retractable net includes a first clip disposed at a first distal corner of the retractable net, and a second clip disposed at a second distal corner of the retractable net.

10. A vehicle as set forth in claim 8 wherein each of the first lateral side wall and the second lateral side wall include a plurality of tie-downs operable to engage the first clip and the second clip to secure the retractable net relative to the first lateral side wall and the second lateral side wall respectively.

* * * * *